(12) United States Patent
Xu et al.

(10) Patent No.: US 12,512,926 B2
(45) Date of Patent: Dec. 30, 2025

(54) DATA TRANSMISSION METHOD, DEVICE, AND STORAGE MEDIUM

(71) Applicant: ZTE CORPORATION, Shenzhen (CN)

(72) Inventors: Jin Xu, Shenzhen (CN); Kai Niu, Shenzhen (CN); Jinsheng Dai, Shenzhen (CN); Chulong Liang, Shenzhen (CN); Mengzhu Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/282,469

(22) PCT Filed: Feb. 23, 2022

(86) PCT No.: PCT/CN2022/077400
§ 371 (c)(1),
(2) Date: Sep. 15, 2023

(87) PCT Pub. No.: WO2022/193918
PCT Pub. Date: Sep. 22, 2022

(65) Prior Publication Data
US 2024/0154719 A1   May 9, 2024

(30) Foreign Application Priority Data
Mar. 16, 2021  (CN) .......................... 202110282797.9

(51) Int. Cl.
*H04L 1/00* (2006.01)
*H03M 13/13* (2006.01)

(52) U.S. Cl.
CPC .......... *H04L 1/0041* (2013.01); *H03M 13/13* (2013.01); *H04L 1/0058* (2013.01); *H04L 1/0071* (2013.01)

(58) Field of Classification Search
CPC ... H04L 1/0041; H04L 1/0058; H04L 1/0071; H04L 1/0009; H04L 1/0057; H04L 1/1819; H03M 13/13
(Continued)

(56) References Cited

U.S. PATENT DOCUMENTS 10,009,146 B2 *   6/2018   Shen ...................... H03M 13/13
2016/0352464 A1 * 12/2016  Shen ...................... H04L 1/0067
(Continued)

FOREIGN PATENT DOCUMENTS

CN   105743621 A    7/2016
CN   111865491 A   10/2020
(Continued)

OTHER PUBLICATIONS

International Search Report for Application No. PCT/CN2022/077400, dated May 17, 2022, 6 pages including English language translation.
(Continued)

*Primary Examiner* — James C Kerveros
(74) *Attorney, Agent, or Firm* — Morgan, Lewis & Bockius LLP

(57) ABSTRACT

Provided are a data transmission method and device and a storage medium. The method includes selecting a first number of bits from a to-be-transmitted information bit sequence to form a to-be-coded bit sequence of a retransmitted data block; polar-coding the to-be-coded bit sequence of the retransmitted data block to obtain a coded bit sequence; combining the coded bit sequence with a coded first-transmission data block to obtain the current to-be-transmitted data block; and performing digital baseband modulation on the current to-be-transmitted data block and then sending the modulated current to-be-transmitted data block to a second communication node.

20 Claims, 3 Drawing Sheets

(58) Field of Classification Search
USPC .......................................................... 714/746
See application file for complete search history.

(56) References Cited

U.S. PATENT DOCUMENTS

| | | | |
|---|---|---|---|
| 2018/0026751 A1* | 1/2018 | Li ........................ | H04L 1/0041 714/751 |
| 2019/0052487 A1* | 2/2019 | Shelby .............. | H04L 25/03866 |
| 2019/0149176 A1* | 5/2019 | Hui ................... | H03M 13/6356 714/790 |
| 2019/0363823 A1* | 11/2019 | Zhang ................. | H04L 1/0061 |
| 2019/0386858 A1* | 12/2019 | Wu ....................... | H04L 1/1819 |
| 2020/0052809 A1* | 2/2020 | Hong ................... | H04L 1/1812 |
| 2020/0350932 A1* | 11/2020 | Chen ................. | H03M 13/6362 |
| 2022/0140946 A1* | 5/2022 | Chen ................. | H03M 13/6368 370/328 |
| 2023/0291498 A1* | 9/2023 | Kim ..................... | H04L 1/0057 |

FOREIGN PATENT DOCUMENTS

| | | |
|---|---|---|
| WO | WO-2016154972 A1 | 10/2016 |
| WO | WO-2020198976 A1 | 10/2020 |

OTHER PUBLICATIONS

Tavildar, S. R., "Bit-Permuted Coded Modulation for Polar Codes", 2017 *IEEE Wireless Communications and Networking Conference Workshops (WCNCW)*, May 4, 2017 (May 4, 2017), section III.

Tian, Kuangda et al., "Low-Complexity Hybrid ARQ Scheme for Polar Codes with Higher Order Modulation", *GLOBECOM 2017—2017 IEEE Global Communications Conference*, Jan. 15, 2018 (Jan. 15, 2018), sections II and III.

Extended European Search Report in Application No. 22770273.5, dated Dec. 2, 2024, 11 pages.

Liang Ma et al. "An Incremental Redundancy HARQ Scheme for Polar Code", Aug. 31, 2017, pp. 1-6, XP055449712, URL:https://arxiv.org/pdf/1708.09679.pdf.

Huawei et al. "HARQ scheme for polar codes", 3GPP Draft; R1-1611255 HARQ Scheme for Polar Codes, 3rd Generation Partnership Project (3GPP), vol. RAN WG1, No. Reno, USA; Nov. 14, 2016 Nov. 18, 2016, Nov. 3, 2016, XP051189034, URL:http://www.3gpp.org/ftp/tsg_ran/WG1_RL 1/TSGR1_87/Docs/.

* cited by examiner

DATA TRANSMISSION METHOD, DEVICE, AND STORAGE MEDIUM

CROSS-REFERENCE TO RELATED APPLICATIONS

This application is a national stage application filed under 35 U.S.C. 371 based on International Patent Application No. PCT/CN2022/077400, filed on Feb. 23, 2022, which claims priority to Chinese Patent Application No. 202110282797.9 filed with the China National Intellectual Property Administration (CNIPA) on Mar. 16, 2021, the disclosures of which are incorporated herein by reference in their entireties.

TECHNICAL FIELD

The present application relates to communications, for example, a data communication method and device and a storage medium.

BACKGROUND

Polar code is newly proposed for channel coding in recent years. Polar code is currently the only known code that can be proved by a rigorous mathematical method to achieve channel capacity in channel coding. Due to its excellent progressiveness and structured construction, polar code is an excellent channel error-correcting code that has been used for one of the main coding modes of control information in the 5$^{th}$ generation mobile communication technology (5G for short) standards. However, polar code in 5G has no capability of incremental redundancy hybrid automatic repeat request (IR-HARQ) and is applicable only to low-order modulation scheme including quadrature phase-shift keying (QPSK).

Moreover, construction of block polarization (BP) HARQ is based on Gaussian approximation (GA), but GA is rather complex in online real-time calculation and thus is not suitable for a practical communication system. Therefore, it is urgent to solve the problem of how to reduce computational complexity effectively on the premise that IR-HARQ and high-order modulation are supported.

SUMMARY

Embodiments of the present application provide a data transmission method and device and a storage medium, reducing computational complexity effectively while supporting IR-HARQ and high-order modulation.

An embodiment of the present application provides a data transmission method. The method is applied to a first communication node and includes selecting a first number of bits from a to-be-transmitted information bit sequence to form a to-be-coded bit sequence of a retransmitted data block; polar-coding the to-be-coded bit sequence of the retransmitted data block to obtain a coded bit sequence; combining the coded bit sequence with a coded first-transmission data block to obtain the current to-be-transmitted data block; and performing digital baseband modulation on the current to-be-transmitted data block and then sending the modulated current to-be-transmitted data block to a second communication node.

An embodiment of the present application provides a data transmission apparatus. The apparatus is applied to a first communication node and includes a bit selection module configured to select a first number of bits from a to-be-transmitted information bit sequence to form a to-be-coded bit sequence of a retransmitted data block; a polar-coding module configured to polar-code the to-be-coded bit sequence of the retransmitted data block to obtain a coded bit sequence; a combiner configured to combine the coded bit sequence with a coded first-transmission data block to obtain the current to-be-transmitted data block; and a modulator configured to perform digital baseband modulation on the current to-be-transmitted data block and then send the modulated current to-be-transmitted data block to a second communication node.

An embodiment of the present application provides a data transmission device. The device includes a communication module, a memory, and one or more processors.

The communication module is configured to perform communicative interaction between a plurality of communication nodes.

The memory is configured to store one or more programs.

The one or more processors are configured to, when executing the one or more programs, perform the method of any previous embodiment.

An embodiment of the present application provides a storage medium storing a computer program which, when executed by a processor, causes the processor to perform the method of any previous embodiment.

DETAILED DESCRIPTION

Figure 1:
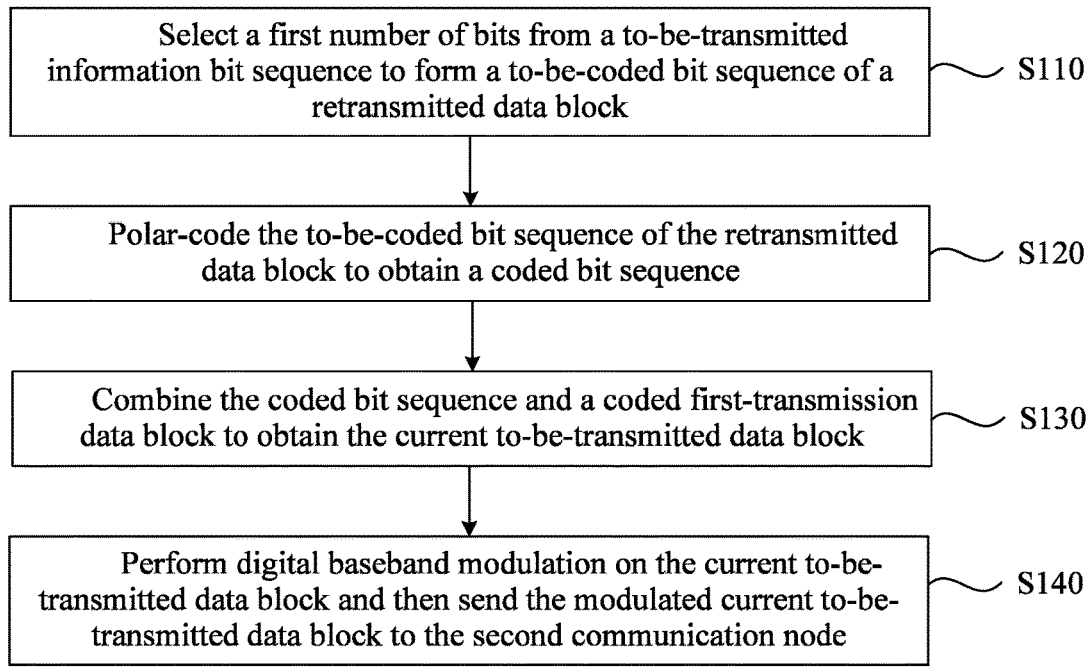
FIG. 1 is a flowchart of a data transmission method according to an embodiment of the present application.

Embodiments of the present application are described hereinafter in conjunction with drawings. The present application is described hereinafter in conjunction with the embodiments and the drawings. The examples listed hereinafter are intended to explain the present application and not to limit the scope of the present application.

HARQ is a key technology for link adaptation in a digital communication system. Polar codes and high-order modulation are linked so that a signal design can be optimized in a Euclidean space. HARQ and polar codes are combined so that the transmission reliability and the link throughput can be improved. Two HARQ schemes are widely used in a practical system. One is chase combining HARQ (CC-HARQ) in which in each retransmission, the transmitting terminal sends a code word that is the same as a code word sent in the first transmission; and the receiving terminal performs soft information combination on the newly received signal and the previously received signals and performs decoding according to the combined signal soft information. The other is IR-HARQ in which the transmitting terminal uses a different channel coding scheme in each transmission; and the receiving terminal combines the newly received signal and all previously received signals, which is considered that the receiving terminal decodes a code having a longer code length and a lower code rate.

Rate matching refers to adapting the number (generally a power of 2) of polar-coded bits to the corresponding physical channel resource (the number of bits carried) by adjusting (increasing or decreasing) the number of bits. For example, when the channel resource can carry up to M=600 bits and the number of polar-coded bits is $N=2^{10}=1024$, it is required to select M bits from the N bits in a certain manner and send the selected M bits in a channel. Polar code rate matching is performed in three modes: puncturing, shortening, and repeating. Here puncturing means selecting the (N−M+1)th bit to the last bit. The first bit to the (N−M)th bit may be regarded as punctured bits. Here shortening means selecting the first bit to the Mth bit. The (M+1)th bit to the Nth bit may be regarded as shortened bits. If M>N, repeating is performed. That is, M bits, that is, the first bit to the Mth bit, are cyclically selected from a coded bit sequence.

The proposal of bit-interleaved coded modulation (BICM) is a major breakthrough in research on coded modulation. BICM serially cascades a channel coding module, a bit-level interleaver, and a memoryless modulation module to increase coded diversity and achieve a better performance in a channel fading scenario. Additionally, the channel coding module and the modulation module in BICM are separated by the interleaver. The two can be designed separately and can be implemented easily. In fact, BICM has been adopted by various communication standards and has been widely used in wireless communication systems. A combination of BICM and polar coding forms the BIPCM technology of the present application.

This solution provides a data transmission method. The method uses a BIPCM-HARQ scheme, supporting IR-HARQ and high-order modulation, having an excellent performance and a low complexity and facilitating engineering implementation.

In an embodiment, FIG. 1 is a flowchart of a data transmission method according to an embodiment of the present application. This embodiment may be implemented by a data transmission device. The data transmission device may be a first communication node (for example, user equipment or a base station). When the first communication node is a user equipment, a second communication node is a base station. When the first communication node is a base station, the second communication node is a user equipment. As shown in FIG. 1, this embodiment includes S110, S120, S130, and S140.

In S110, a first number of bits are selected from a to-be-transmitted information bit sequence to form a to-be-coded bit sequence of a retransmitted data block.

In an embodiment, when the second communication node fails to receive all information bit sequences sent by the first communication node, the first communication node retransmits information bit sequences to the second communication node. During retransmission, a data block carrying an information bit sequence is a retransmitted data block. The to-be-transmitted bit sequence refers to all information bit sequences that the first communication node is required to send to the second communication node. It can be understood as that the number of bits contained in the to-be-coded bit sequence is less than or equal to the number of bits contained in the to-be-transmitted information bit sequence.

In S120, the to-be-coded bit sequence of the retransmitted data block is polar-coded so that a coded bit sequence is obtained.

In S130, the coded bit sequence and a coded first-transmission data block are combined to obtain the current to-be-transmitted data block.

In S140, digital baseband modulation is performed on the current to-be-transmitted data block, and then the modulated current to-be-transmitted data block is sent to the second communication node.

In this embodiment, the method includes that the first communication node selects a first number of bits from a to-be-transmitted information bit sequence to form a to-be-coded bit sequence of a retransmitted data block; the first communication node polar-codes the to-be-coded bit sequence of the retransmitted data block to obtain a coded bit sequence; the first communication node combines the coded bit sequence with a coded first-transmission data block to obtain the current to-be-transmitted data block; and the first communication node performs digital baseband modulation on the current to-be-transmitted data block and then sends the modulated current to-be-transmitted data block to the second communication node. This embodiment combines BICM and polar coding into a BIPCM-HARQ scheme, reducing computational complexity effectively while supporting IR-HARQ and high-order modulation.

In an embodiment, the first number is determined by one of a first parameter set or a second parameter set.

The first parameter set contains a physical channel resource parameter of the retransmitted data block and a spectrum efficiency parameter of the retransmitted data block. The second parameter set contains a parallel-polarization-channel-related parameter. In this embodiment, the number (that is, the first number) of bits contained in the to-be-coded bit sequence is determined by one of the first parameter set or the second parameter set.

In an embodiment, the physical channel resource parameter of the retransmitted data block includes at least one of: the number $N_{slot}$ of slots; the number $N_{OFDM}^{slot}$ of orthogonal frequency-division multiplexing (OFDM) symbols contained in each slot; the number $N_{RB}$ of resource blocks; the number $N_{SC}^{RB}$ of frequency domain subcarriers contained in each resource block; the number $N_{RE}^{RB}$ of resource units in each resource block; or the number $N_{layer}$ of spatial layers.

The spectrum efficiency parameter of the retransmitted data block includes at least one of: a modulation order M; a transmission code rate R; or a spectral efficiency SF.

The parallel-polarization-channel-related parameter includes at least one of: the number of bits in the to-be-transmitted information bit sequence; the bit polarization channel capacity of the first-transmission data block (i.e., the data block for the first transmission); the bit polarization channel capacity of the retransmitted data block; the length of the first-transmission data block; the length of the retransmitted data block; a channel feature indication parameter; the number of groups of bit polarization channels; or a modulation order.

In an embodiment, the number of bits in the to-be-transmitted information bit sequence is determined by a physical channel resource parameter of the first-transmission data block and a spectrum efficiency parameter of the first-transmission data block.

The length of the first-transmission data block is determined by the physical channel resource parameter of the first-transmission data block and the modulation order.

The length of the retransmitted data block is determined by the physical channel resource parameter of the retransmitted data block and the modulation order.

The channel feature indication parameter is configured to indicate channel quality or a channel type.

In an embodiment, the first number is determined in one of the following manners:

The first number is determined according to the number of slots, the number of OFDM symbols contained in each slot, the number of resource blocks, the number of frequency domain subcarriers contained in each resource block, the number of spatial layers, the modulation order, and the transmission code rate.

The first number is determined according to the number of slots, the number of OFDM symbols contained in each slot, the number of resource blocks, the number of frequency domain subcarriers contained in each resource block, the number of spatial layers, and the spectral efficiency.

The first number is determined according to the number of resource blocks, the number of resource units in each resource block, the number of spatial layers, the modulation order, and the transmission code rate.

The first number is determined according to the number of resource blocks, the number of resource units in each resource block, the number of spatial layers, the spectral efficiency.

The first number is determined according to the bit polarization channel capacity of the first-transmission data block, the bit polarization channel capacity of the retransmitted data block, and the number of bits in the to-be-transmitted information bit sequence.

The number (that is, the first number) of bits contained in the to-be-coded bit sequence may be denoted by $K_t$. In this embodiment, $K_t$ is calculated in one of the following manners:

$$K_t = N_{slot} \cdot N_{OFDM}^{slot} \cdot N_{RB} \cdot N_{SC}^{RB} \cdot N_{layer} \cdot M \cdot R$$

$$K_t = N_{slot} \cdot N_{OFDM}^{slot} \cdot N_{RB} \cdot N_{SC}^{RB} \cdot N_{layer} \cdot SF$$

$$K_t = N_{RB} \cdot N_{RE}^{RB} \cdot N_{layer} \cdot M \cdot R$$

$$K_t = N_{RB} \cdot N_{RE}^{RB} \cdot N_{layer} \cdot SF$$

t denotes that the to-be-transmitted data block is a data block transmitted for the tth time. t is a positive integer. For example, if the current data block is the first-transmission data block, then t=1; and if the current data block is a retransmitted data block, then t≥2.

In an embodiment, the selection principle of the first number of bits includes selecting a first number of information bits having the lowest reliability from (t−1) transmitted data blocks, where t denotes the number of transmissions.

In an embodiment, polar-coding the to-be-coded bit sequence of the retransmitted data block to obtain the coded bit sequence includes: selecting a first number of bit positions having the highest reliability from transmission bit positions of the retransmitted data block to serve as to-be-coded information bit positions of the retransmitted data block; copying the to-be-coded bit sequence composed of the first number of bits to the to-be-coded information bit positions of the retransmitted data block separately to obtain a to-be-coded bit sequence of the retransmitted data block; and polar-coding the to-be-coded bit sequence to obtain the coded bit sequence.

In this embodiment, the to-be-coded bit sequence refers to a bit sequence before coding.

In an embodiment, the transmission bit positions include bit positions other than punctured bit positions, or bit positions other than shortened bit positions.

In an embodiment, combining the coded bit sequence with the coded first-transmission data block to obtain the current to-be-transmitted data block includes bit-interleaving the coded bit sequence and the coded first-transmission data block separately to obtain an interleaved bit sequence; splitting the interleaved bit sequence into m bit subsequences each having a length of $M_t/m$; and combining the m bit subsequences of the retransmitted data block with the m bit subsequences of the first-transmission data block separately to obtain the current to-be-transmitted data block, where m denotes the number of groups of bit polarization channels, $M_t$ denotes the length of the tth-transmission data block.

Figure 2:
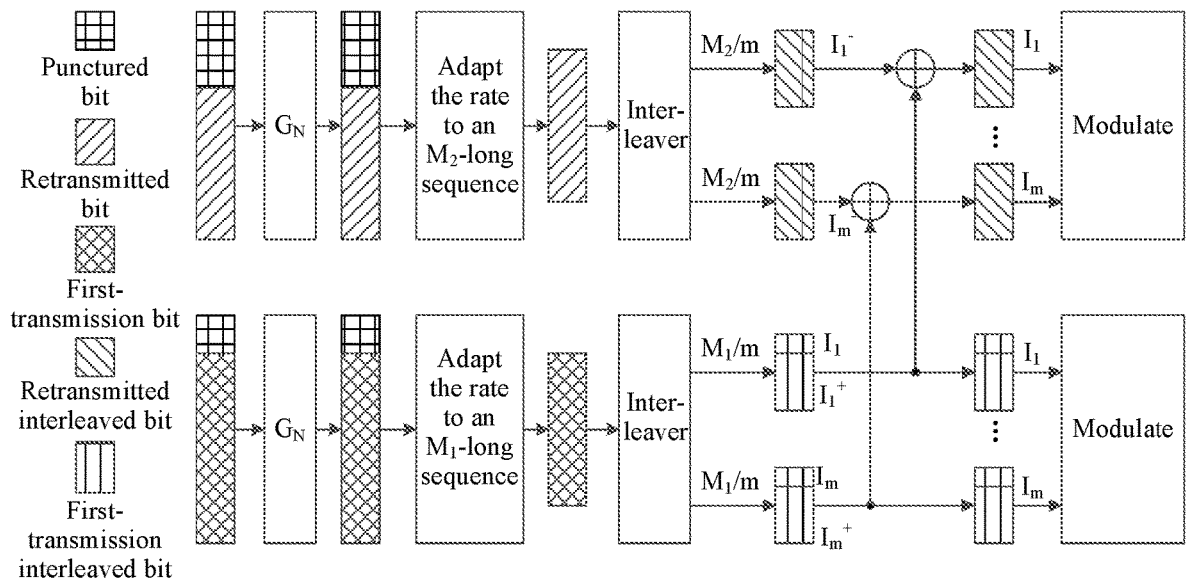
FIG. 2 is a diagram illustrating a puncturing-based-bit-interleaved polar-coded modulation HARQ (puncturing-based-BIPCM-HARQ) scheme in two transmissions according to an embodiment of the present application.
Figure 3:
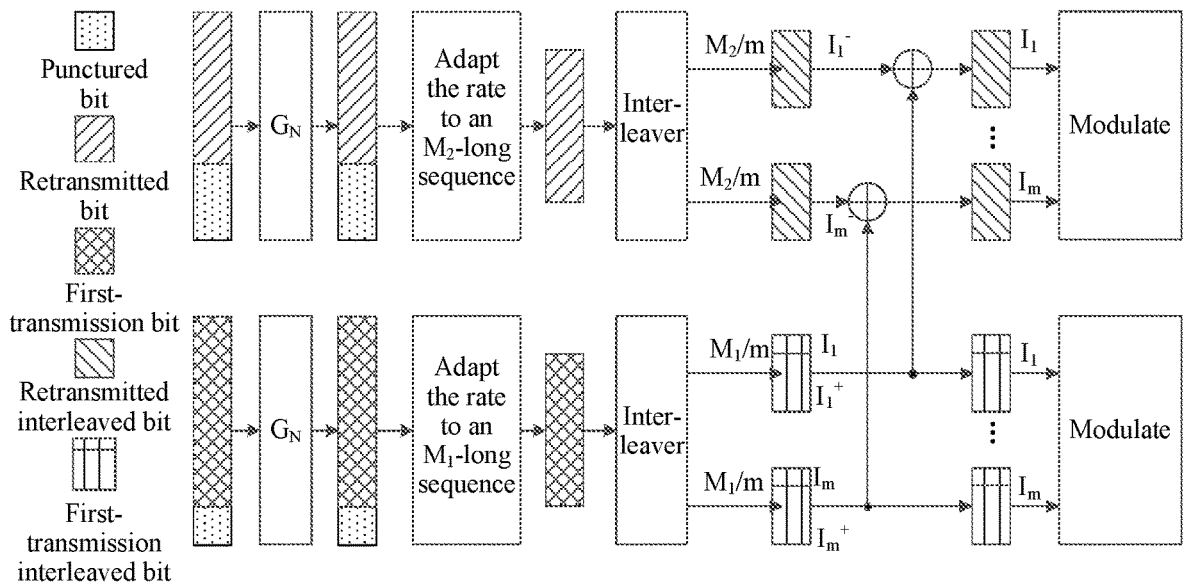
FIG. 3 is a diagram illustrating a shortening-based-bit-interleaved polar-coded modulation HARQ (shortening-based-BIPCM-HARQ) scheme in two transmissions according to an embodiment of the present application.

In an embodiment, FIG. 2 is a diagram illustrating a puncturing-based-BIPCM-HARQ scheme in two transmissions according to an embodiment of the present application, and FIG. 3 is a diagram illustrating a shortening-based-BIPCM-HARQ scheme in two transmissions according to an embodiment of the present application. FIG. 2 illustrates a puncturing-based-BIPCM-HARQ process in the first transmission and a retransmission. As shown in FIG. 2, the rate matching mode—puncturing is used. FIG. 3 illustrates a shortening-based-BIPCM-HARQ process in the first transmission and a retransmission. As shown in FIG. 3, the rate matching mode—shortening is used. m denotes the number of groups of bit polarization channels. m may be equal to the modulation order or half of the modulation order of the digital baseband modulation of the first transmission or retransmission. $M_1$ and $M_2$ denote the length of the first-transmission data block and the length of the retransmitted data block respectively. $I_i$ denotes the polarization channel capacity of the ith group of bits of the first-transmission data block. $I_i^+$ and $I_i^-$ denote the polarization channel capacity of the ith group of polar-coded bits of a data block and the polarization channel capacity of the ith group of polar-coded bits of the retransmitted data block respectively. i is a positive integer. i=1, 2, . . . , m.

As shown in FIG. 2, for the two transmissions, the bit sequence of the first transmission and the bit sequence of the retransmission are each decomposed into m groups of parallel bit subchannels. $I_i(I \leq i \leq m)$ denotes the polarization channel capacity of the ith group of bits of the first-transmission data block. $I_i$ denotes a function of modulation scheme and/or a function of channel quality indicator parameter. $I_i^+$ and $I_i^-$ denote the polarization channel capacity of the ith group of combined bits of the first-transmission data block and the polarization channel capacity of the ith group of combined bits of the retransmitted data block respectively. $I_i^+$ and $I_i^-$ may be obtained from $I_i$. Illustratively, the relational expression between $I_i^+$ and $I_i$ and the relational expression between $I_i^-$ and $I_i$ are as follows:

$$\begin{cases} I_i^- = I_i^2 + \delta \\ I_i^+ = 2 \cdot I_i - I_i^2 - \delta \end{cases}$$

Here $\delta$ is related to the channel type. Illustratively, when the channel type is an erasure channel, the value of $\delta$ may be 0; and when the channel type is a noisy channel, the value of $\delta$ may be $$\delta = -\frac{|I_i - 0.5|}{32} + \frac{1}{64}.$$

The number $K_t$ of bits contained in the to-be-encoded bit sequence in the retransmitted data block may be determined by the bit polarization channel capacity of the first-transmission data block, the bit polarization channel capacity of the retransmitted data block, and the number of bits in the to-be-transmitted information bit sequence. Illustratively, $K_t$ may be calculated as follows:

$$K_t = \frac{C_t}{\sum_{r=1}^{t} C_r} \cdot K_1$$

t denotes that the to-be-transmitted data block is a data block transmitted for the tth time (or retransmitted for the (t−1)th time). t is a positive integer. If the current data block is the first-transmission data block, then t=1; and if the current data block is a retransmitted data block, then t≥2. $C_r$ denotes the capacity value of the data block transmitted for the rth time. The capacity $C_1$ of the first-transmission data block is a function of the modulation order, the length $M_1$ of the first-transmission data block, the length $M_2$ of the retransmitted data block, the bit polarization channel capacity $I_i$ of the first-transmission data block, and $I_i^+$. $K_1$ denotes the number of bits in the to-be-transmitted information bit sequence. Illustratively, the capacity $C_1$ of the first-transmission data block may be calculated as follows:

$$C_1 = \begin{cases} \frac{M_t}{m}\sum_{i=1}^{m} I_i^+ + \frac{M_1 - M_t}{m}\sum_{i=1}^{m} I_i, & \text{if } M_1 \geq M_t \\ \frac{M_1}{m}\sum_{i=1}^{m} I_i^+, & \text{if } M_1 < M_t \end{cases}$$

Illustratively, the capacity $C_t$ (t≥2) of the retransmitted data block may be calculated as follows:

$$C_t = \begin{cases} \frac{M_t}{m}\sum_{i=1}^{m} I_i^-, & \text{if } M_1 \geq M_t \\ \frac{M_1}{m}\sum_{i=1}^{m} I^- + \frac{M_t - M_1}{m}\sum_{i=1}^{m} I'_i, & \text{if } M_1 < M_t \end{cases}$$

$M_t$ denotes the length of the data block transmitted for the tth time. $I_i$ and $I'_i$ denote the polarization channel capacity of the ith group of bits of the first-transmission data block and the polarization channel capacity of the ith group of bits of a retransmitted data block respectively. $I_i^+$ and $I_i^-$ denote the bit polarization channel capacity of the ith group of polar-coded bits of the first-transmission data block and the bit polarization channel capacity of the ith group of polar-coded bits of a retransmitted data block respectively.

In an embodiment, selecting $K_t$ bits from the to-be-transmitted information bit sequence may include selecting $K_t$ information bits having the lowest reliability from the previously transmitted (t−1) data blocks. In this embodiment, the reliability of information bits may be determined in the following two modes: The first mode is to determine the reliability of information bits according to bit polarization channel capacity. That is, the reliability is high when the capacity is high, and the reliability is low when the capacity is low. The second mode is to determine the reliability of information bits according to the positions of bit indexes in a polar code reliability sequence. Illustratively, in 5G New Radio (5G NR), the reliability of information bits may be determined according to a polar sequence. The polar sequence is to sort bit indexes in order of reliability from low to high. That is, the reliability of a bit corresponding to an index value earlier in the polar sequence is lower than the reliability of a bit corresponding to an index value later in the polar sequence.

In this embodiment, if t=2, that is, if the current data block is a data block transmitted for the second time, $K_2$ bits having the lowest reliability are selected from the information bit sequence of the first-transmission data block. The reliability ranking of information bits in the first-transmission data block is indicated by the polar code reliability sequence of the first-transmission data block. If t>2, that is, if the current data block is a data block transmitted for the third time or later, $K_j^{t-1} - K_j^t$ bits having the lowest reliability are selected from the information bit sequence of (t−1) transmitted data blocks to form the information bit sequence (whose length is $K_t$ bits) of a data block transmitted for the tth time. j is a positive integer. j=1, 2, . . . , t−1. $K_j^t$ denotes the number of equivalent information bits of the data block transmitted for the jth time after the data block has been transmitted t times. Illustratively, $K_j^t$ may be calculated as follows:

$$K_j^t = \frac{C_i}{\sum_{r=1}^{t} C_r} \cdot K_1$$

Similarly, $K_j^{t-1}$ denotes the number of equivalent information bits of the data block transmitted for the jth time after the data block has been transmitted (t−1) times. Illustratively, $K_j^{t-1}$ may be calculated as follows:

$$K_j^{t-1} = \frac{C_i}{\sum_{r=1}^{t-1} C_r} \cdot K_1$$

Figure 4:
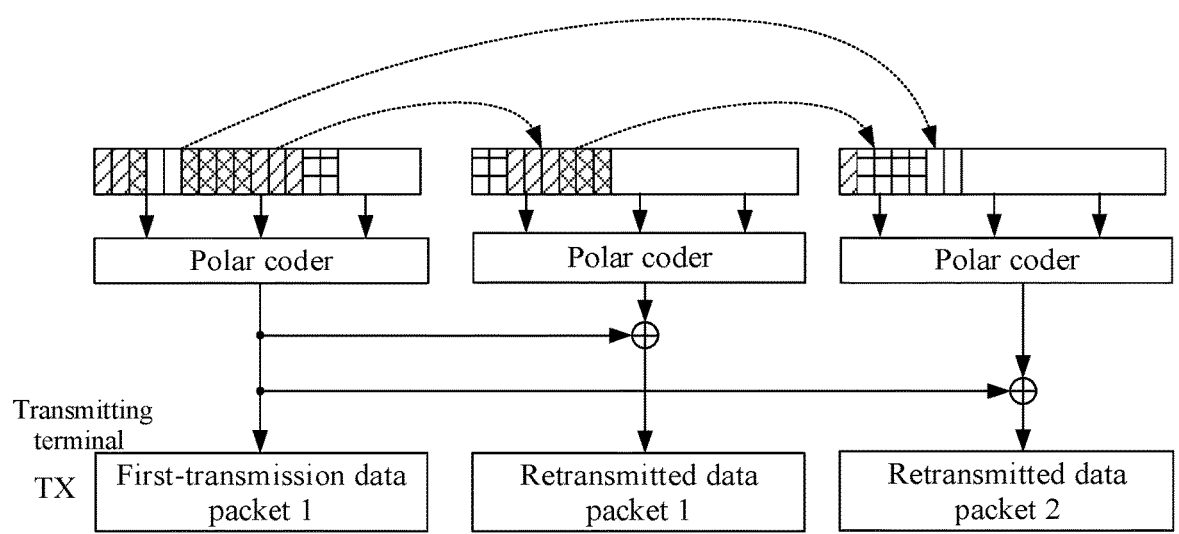
FIG. 4 is a diagram illustrating polar coding of retransmitted data blocks according to an embodiment of the present application.

FIG. 4 is a diagram illustrating polar coding of retransmitted data blocks according to an embodiment of the present application. As shown in FIG. 4, polar-coding the to-be-coded bit sequence of the retransmitted data block includes selecting $K_t$ bit positions having the highest reliability from transmission bit positions of the retransmitted data block to serve as to-be-coded information bit positions of the retransmitted data block; copying the to-be-coded bit sequence composed of the $K_t$ bits to the to-be-coded information bit positions of the retransmitted data block respectively to obtain a to-be-coded bit sequence of the retransmitted data block; and multiplying the to-be-coded bit sequence by the coding matrix of the polar code to obtain the coded bit sequence.

In an embodiment, the transmission bit positions of the retransmitted data block does not include punctured bit positions or shortened bit positions.

In an embodiment, if the length of the coded bit sequence is not equal to $M_2$, the coded bit sequence is punctured, shortened, or repeated to form a rate-matched bit sequence. FIG. 2 uses the rate matching mode—puncturing. FIG. 3 uses the rate matching mode—shortening.

Illustratively, if t=2, that is, if the current data block is a data block transmitted for the second time, then after the number $K_2$ (that is, the first number) of bits contained in the to-be-coded bit sequence of the retransmitted data block is calculated using the preceding method, the subchannels of the retransmitted data block are sorted using the polar code reliability sequence (that is, the sequence obtained by determination of reliability by using the polar sequence in the previous embodiment) of 5G NR, and $K_2$ bit positions having the highest reliability are selected from the transmission bit positions not including punctured bit positions or shortened bit positions to serve as to-be-coded information bit positions of the retransmitted data block; $K_2$ bit positions having the lowest reliability in the information bit positions of the first-transmission data block are copied to to-be-coded information bit positions (that is, $K_2$ information bit positions) of the retransmitted data block, and other bit positions in the to-be-coded bit sequence are configured as frozen bit positions; and then the to-be-coded bit sequence is multiplied by the coding matrix of the polar code to obtain the coded bit sequence. If the length $L_2$ of the coded bit sequence is not equal to $M_2$, the coded bit sequence is punctured or shortened by $(L_2-M_2)$ bits to obtain a rate-matched coded sequence.

Illustratively, if t>2, that is, if the current data block is a data block transmitted for the third time or later, then after the number $K_t$ (that is, the first number) of bits contained in the to-be-coded bit sequence of the retransmitted data block is calculated using the preceding method, the subchannels of the retransmitted data block are sorted using the polar code reliability sequence (that is, the sequence obtained by determination of reliability by using the polar sequence in the previous embodiment) of 5G NR, and $K_t$ bit positions having the highest reliability are selected from the transmission bit positions not including punctured bit positions or shortened bit positions to serve as to-be-coded information bit positions of the retransmitted data block; $K_j^{t-1}-K_j^t$ bits having the lowest reliability in the information bit positions of the (t-1) transmitted data blocks to form $K_t$ information bits of the data block transmitted for the tth time, the $K_t$ information bits are copied to $K_t$ information bit positions of the retransmitted data block, and other bit positions in the to-be-coded bit sequence are configured as frozen bit positions; and then the to-be-coded bit sequence is multiplied by the coding matrix of the polar code to obtain the coded bit sequence. If the length $L_t$ of the coded bit sequence is not equal to $M_t$, the coded bit sequence is punctured or shortened by $(L_t-M_t)$ bits to obtain a rate-matched coded sequence.

As shown in FIG. 2, combining the coded retransmitted data block with the coded first-transmission data block includes bit-interleaving the polar-coded bit sequence (including the rate-matched bit sequence) of the first-transmission data block and the polar-coded bit sequence (including the rate-matched bit sequence) of the retransmitted data block separately to obtain an interleaved bit sequence; splitting the interleaved bit sequence into m bit subsequences each having a length of/Wm; and combining the m bit subsequences of the retransmitted data block with the m bit subsequences of the first-transmission data block separately to obtain the current to-be-transmitted data block.

m denotes the number of groups of bit polarization channels. m may be equal to the modulation order or half of the modulation order of the digital baseband modulation of the first transmission or retransmission.

Bit interleaving refers to changing the sort order of some or all bits in the first-transmission data block and the retransmitted data block. In this embodiment, different bit interleaving patterns may be used for the first-transmission data block and the retransmitted data block.

Combining m bit subsequences of the retransmitted data block with m bit subsequences of the first-transmission data block means that when $M_1 \geq M_t$, bitwise exclusive OR (or modulo-two addition) of corresponding bits is performed on m bit subsequences having a length of $M_t/m$ in the retransmitted data block and the last $M_t/m$ bits in m bit subsequences having a length of $M_1/m$ in the first-transmission data block; and when $M_1<M_t$, bitwise exclusive OR (or modulo-two addition) of corresponding bits is performed on the last $M_t/m$ bits in m bit subsequences having a length of $M_t/m$ in the retransmitted data block and m bit subsequences having a length of $M_1/m$ in the first-transmission data block. $M_1$ is the length of the first-transmission data block. $M_t$ is the length of the retransmitted data block.

In an embodiment, performing digital baseband modulation on the current to-be-transmitted data block means that when the number m of groups of bit polarization channels is equal to the modulation order, one bit is taken from each of the m bit subsequences of the current to-be-transmitted data block to form $M_t/m$ bit groups composed of m bits, and m-order digital baseband modulation is performed on the bit groups to obtain $M_t/m$ digital baseband modulated symbols; and when the number m of groups of bit polarization channels is equal to half of the modulation order, two bits are taken from each of the m bit subsequences of the current to-be-transmitted data block to form $M_t/(2*m)$ bit groups composed of 2*m bits, and 2*m-order digital baseband modulation is performed on the bit groups to obtain $M_t/(2*m)$ digital baseband modulated symbols.

Commonly used digital baseband modulation modes include, but are not limited to, binary phase-shift keying (BPSK), QPSK, 16 quadrature amplitude modulation (QAM), 64 QAM, 256 QAM, and 1024 QAM, whose modulation orders are 1, 2, 4, 6, 8 and 10 respectively.

In an embodiment, the BIPCM-HARQ scheme in this embodiment of the present application and the polar-coded HARQ scheme in the related art are different in terms of structure, coding, and modulation. In the BIPCM framework, each modulated symbol corresponds to m bit channels having different reliabilities after being demodulated, where m is S-ary high-order modulation order. The BIPCM-HARQ scheme in this embodiment of the present application can change different mother code lengths and any rate matching scheme in each transmission. For the tth transmission, polar coding is performed independently. Then the coded block of the tth time is rate-adapted to obtain a rate-adapted binary bit vector having a length of $M_t$, and the rate-adapted binary vector is bit-interleaved, where $M_t$ is the code length of the tth transmission. Then in the (S=2m) high-order modulation, the tth randomly-interleaved binary bit vector is divided into m groups of bit vectors having a length of $M_t/m$ according to different reliabilities of demodulated bit channels. Finally, modulo-two addition is performed on the m groups of bit vectors each having a length of $M_1/m$ in the tth transmission and the last $M_t/m$ bits of the randomly-interleaved m groups of bit vectors each having a length of $M_1/m$ in the first transmission separately so that inter-block polarization is completed to obtain binary code words of the tth-transmission $M_t$ bits; and modulation is performed to obtain the tth-transmission $M_t$ code words.

FIG. 2 and FIG. 3 illustrates a puncturing-based-BIPCM-HARQ scheme in two transmissions and a shortening-based-BIPCM-HARQ scheme in two transmissions respectively.

Construction of a polar coding HARQ scheme in the related art is based on GA. In view that construction based on GA incurs rather complex online real-time calculation that is not suitable for a practical communication system, the present application proposes a BIPCM-HARQ scheme. The BIPCM-HARQ scheme of the present application may use a 5G NR polar code bit channel reliability sequence. The 5G NR polar code bit channel reliability sequence is a construction sequence independent of a channel parameter. The 5G NR polar code bit channel reliability sequence is a fixed sequence that can be used in sorting bit channels as long as the code length of a polar code is provided, omitting problems including channel type and channel quality.

In a BIPCM framework, a multi-ary input channel is decomposed into m parallel modulated bit subchannels having different reliabilities. $I_i(1 \leq i \leq m)$ denotes the channel capacity of m parallel modulated bit subchannels having different reliabilities. $I_i^-$ and $I_i^+$ are the channel capacity of the polar-coded retransmitted code block and the channel capacity of the polar-coded first-transmission code block respectively. If the channel is a binary erasure channel (BEC), $I_i^-$ and $I_i^+$ are calculated as follows:

$$\begin{cases} I_i^- = I_i^2 \\ I_i^+ = 2 \cdot I_i - I_i^2 \end{cases}$$

If the channel is an additive white Gaussian noise (AWGN) channel, $I_i^-$ and $I_i^+$ are calculated as follows:

$$\begin{cases} I_i^- = I_i^2 + \delta \\ I_i^+ = 2 \cdot I_i - I_i^2 - \delta \end{cases}$$

Here $$\delta = -\frac{|I_i - 0.5|}{32} + \frac{1}{64}.$$

It is assumed that $K_1$ denotes the information bit length of the first-transmission code block at the time of the first transmission, $K_1^2$ and $K_2$ denote the information bit length of the first-transmission code block and the information bit length of the retransmitted code block respectively after retransmission, and $M_1$ and $M_2$ denote the transmission bit length of the first-transmission code block and the transmission bit length of the retransmitted code block respectively. Here $M_1 \geq M_2$. Under the condition that a code length is limited, the information bit lengths of the two transmitted code blocks are allocated proportionally according to the channel capacity. More information bits should be allocated to the transmitted block having a larger channel capacity. After one time of block polarization, the total channel capacity of the first-transmission code block is $$C_1 = \frac{M_2}{m}\sum_{i=1}^{m} I_i^+ + \frac{M_1 - M_2}{m}\sum_{i=1}^{m} I_i,$$

and the total channel capacity of the retransmitted code block is $$C_2 = \frac{M_2}{m}\sum_{i=1}^{m} I_i^-.$$

The ratio of C1 to C2 varies with $I_i$. For the sake of the generality of a HARQ general structure, it is set that $$\frac{1}{m}\sum_{i=1}^{m} I_i = \frac{K_1}{M_1 + M_2}.$$

The total information bit length $K_1$ is allocated proportionally.

$$K_1^2 = \frac{C_1}{C_1 + C_2} \cdot K_1,$$

$$K_2 = \frac{C_2}{C_1 + C_2} \cdot K_1.$$

The information bit length of the retransmitted code block $$K_2 = \frac{M_2}{m}\sum_{i=1}^{m} I_i^-$$

can be obtained. Here $$\frac{1}{m}\sum_{i=1}^{m} I_i = \frac{K_1}{M_1 + M_2}.$$

The information bit length $K_1^2 = K_1 - K_2$ of the first-transmission code block after retransmission can be obtained.

If the number of transmissions is t (t>2), the total channel capacity of each transmitted code block is calculated according to the inter-block polarization of multiple transmitted code blocks. $K_1$ information bits are allocated proportionally to each transmitted block according to the channel capacity of each transmitted code block. It is assumed that $K_i^t(i \leq t)$ denotes the information bit length of the ith transmitted code block in the tth transmission, and $M_i(i \leq t)$ denotes the transmission bit length of the ith transmitted code block. Here $M_i \geq M_j(i \leq j)$. In the tth transmission, the information bit length $K_i^t(i \leq t)$ of each transmitted code block can be calculated. When i=t, it is defined that $K_t^t = K_t$. For the sake of the generality of a HARQ general structure, it is set that $$\frac{1}{m}\sum_{i=1}^{m} I_i = \frac{K_1}{\sum_{i=1}^{t} M_i}.$$

In this embodiment of the present application, when the code rate is $K_1/M_1 \leq 7/16$, a puncturing-based-BIPCM-HARQ scheme is used; and when the code rate is $K_1/M_1 \leq$, 7/16, a shortening-based-BIPCM-HARQ scheme is used.

In the first transmission, subchannels of the first-transmission code block are sorted using a 5G NR standard sequence, and $K_t$ bits having the highest reliability are selected from the transmission bits not including punctured bits or shortened bits to serve as information bits for coding. If decoding failure occurs on the code blocks transmitted for the first time, the code blocks need to be retransmitted. At the time of retransmission, if the length of the retransmitted code block is $M_2$, the retransmission information bit length $M_2$ is determined using the preceding method. After the information bit length $M_2$ of the retransmitted code block is obtained, subchannels of the retransmitted code block are sorted using a 5G NR standard sequence, and $K_2$ bits having the highest reliability are selected from the transmission bits not including punctured bits or shortened bits to serve as information bits of the retransmitted code block. Finally, $K_2$ information bits having the lowest reliability in the information bits of the first-transmission code block are copied to $K_2$ bits having the highest reliability of the second code block. They serve as dynamic frozen bits and information bits of the retransmitted code block respectively. A one-to-one parity check relationship is established between them.

If the number of transmissions is t(t>2), the information bit length $K_i^t$(i≤t) of each code block in the tth transmission is calculated using the preceding scheme. Then subchannels of the tth-transmission code block are sorted using a 5G NR standard sequence, and subchannel indicators of $K_i^t$ bits having the highest reliability are selected from the transmission bits of the tth transmitted code block not including punctured bits or shortened bits to serve as the information bit set $A_t$ of the tth transmitted code block. In the ith transmitted code block, subchannel indicators of $K_i^{t-1}-K_i^t$ (i≤t−1) bits having the lowest reliability are selected from the remaining $K_i^{t-1}$(i≤t−1) information bits to serve as the dynamic frozen bit set $D_i^t$ of the ith transmitted code block in the tth transmission. Information about the dynamic frozen bit set $D_i^t$ of the ith transmitted code block is copied to the information bit set $A_t$ of the tth transmitted code block. A one-to-one parity check relationship is established between them.

If the number of transmissions is t (t>2), the information bit length $K_i^t$ (i≤t) of each code block in the tth transmission is calculated using the preceding scheme. Then subchannels of the tth-transmission code block are sorted using a 5G NR standard sequence, and subchannel indicators of $K_i^t$ bits having the highest reliability are selected from the transmission bits of the tth transmitted code block not including punctured bits or shortened bits to serve as the information bit set $A_t$ of the tth transmitted code block. In the ith transmitted code block, subchannel indicators of $K_i^{t-1}-K_i^t$ (i≤t−1) bits having the lowest reliability are selected from the remaining $K_i^{t-1}$(i≤t−1) information bits to serve as the dynamic frozen bit set $D_i^t$ of the ith transmitted code block in the tth transmission. Information about the dynamic frozen bit set $D_i^t$ of the ith transmitted code block is copied to the information bit set $A_t$ of the tth transmitted code block. A one-to-one parity check relationship is established between them.

Figure 5:
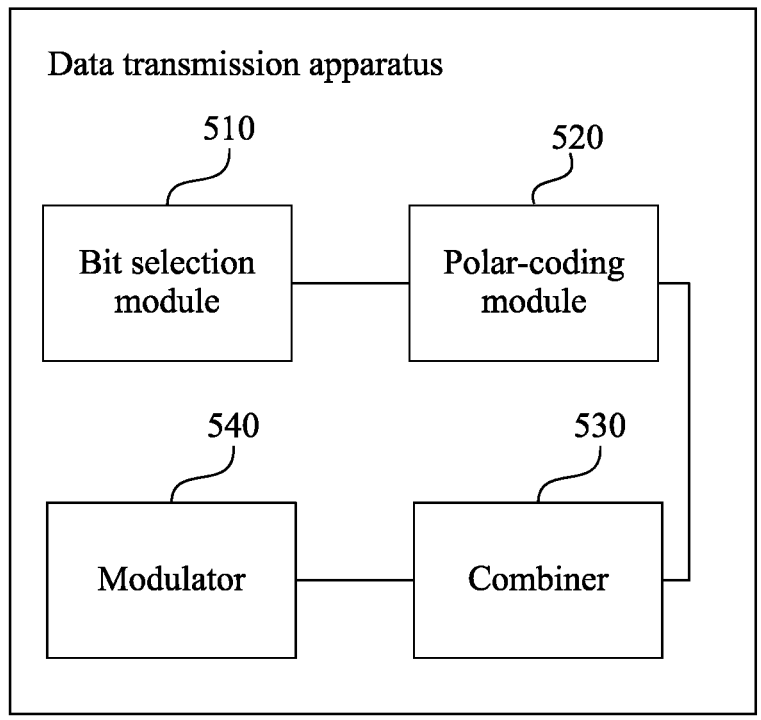
FIG. 5 is a block diagram of a data transmission apparatus according to an embodiment of the present application.

In an embodiment, FIG. 5 is a block diagram of a data transmission apparatus according to an embodiment of the present application. This embodiment is applied to a data transmission device. As shown in FIG. 5, the data transmission apparatus of this embodiment includes a bit selection module 510, a polar-coding module 520, a combiner 530, and a modulator 540.

The bit selection module 510 is configured to select a first number of bits from a to-be-transmitted information bit sequence to form a to-be-coded bit sequence of a retransmitted data block.

The polar-coding module 520 is configured to polar-code the to-be-coded bit sequence of the retransmitted data block to obtain a coded bit sequence.

The combiner 530 is configured to combine the coded bit sequence with a coded first-transmission data block to obtain the current to-be-transmitted data block.

The modulator 540 is configured to perform digital baseband modulation on the current to-be-transmitted data block and then send the modulated current to-be-transmitted data block to a second communication node.

In an embodiment, the first number is determined by one of a first parameter set or a second parameter set.

The first parameter set contains a physical channel resource parameter of the retransmitted data block and a spectrum efficiency parameter of the retransmitted data block. The second parameter set contains a parallel-polarization-channel-related parameter.

In an embodiment, the physical channel resource parameter of the retransmitted data block includes at least one of the number of slots; the number of OFDM symbols contained in each slot; the number of resource blocks; the number of frequency domain subcarriers contained in each resource block; the number of resource units in each resource block; or the number of spatial layers.

The spectrum efficiency parameter of the retransmitted data block includes at least one of a modulation order; a transmission code rate; or a spectral efficiency.

The parallel-polarization-channel-related parameter includes at least one of the number of bits in the to-be-transmitted information bit sequence; the bit polarization channel capacity of the first-transmission data block; the bit polarization channel capacity of the retransmitted data block; the length of the first-transmission data block; the length of the retransmitted data block; a channel feature indication parameter; the number of groups of bit polarization channels; or a modulation order.

In an embodiment, the number of bits in the to-be-transmitted information bit sequence is determined by a physical channel resource parameter of the first-transmission data block and a spectrum efficiency parameter of the first-transmission data block.

The length of the first-transmission data block is determined by the physical channel resource parameter of the first-transmission data block and the modulation order.

The length of the retransmitted data block is determined by the physical channel resource parameter of the retransmitted data block and the modulation order.

The channel feature indication parameter is configured to indicate channel quality or a channel type.

In an embodiment, the first number is determined in one of the following manners:

The first number is determined according to the number of slots; the number of OFDM symbols contained in each slot; the number of resource blocks; the number of frequency domain subcarriers contained in each resource block; the number of spatial layers; the modulation order; and the transmission code rate.

The first number is determined according to the number of slots; the number of OFDM symbols contained in each slot; the number of resource blocks; the number of frequency domain subcarriers contained in each resource block; the number of spatial layers; and the spectral efficiency.

The first number is determined according to the number of resource blocks; the number of resource units in each resource block; the number of spatial layers; the modulation order; and the transmission code rate.

The first number is determined according to the number of resource blocks; the number of resource units in each resource block; the number of spatial layers; the spectral efficiency.

The first number is determined according to the bit polarization channel capacity of the first-transmission data block; the bit polarization channel capacity of the retransmitted data block; and the number of bits in the to-be-transmitted information bit sequence.

In an embodiment, the selection principle of the first number of bits includes selecting a first number of information bits having the lowest reliability from (t−1) transmitted data blocks, where t denotes the number of transmissions.

In an embodiment, the polar-coding module 520 includes a selection unit, a copying unit, and a coding unit.

The selection unit is configured to select a first number of bit positions having the highest reliability from transmission bit positions of the retransmitted data block to serve as to-be-coded information bit positions of the retransmitted data block.

The copying unit is configured to copy the to-be-coded bit sequence composed of the first number of bits to the to-be-coded information bit positions of the retransmitted data block separately to obtain a to-be-coded bit sequence of the retransmitted data block.

The coding unit is configured to polar-code the to-be-coded bit sequence to obtain the coded bit sequence.

In an embodiment, the transmission bit positions include bit positions other than punctured bit positions, or bit positions other than shortened bit positions.

In an embodiment, the combiner 530 includes a bit-interleaving unit, a splitting unit, and a sequence combination unit.

The bit-interleaving unit is configured to bit-interleave the coded bit sequence and the coded first-transmission data block separately to obtain an interleaved bit sequence.

The splitting unit is configured to split the interleaved bit sequence into m bit subsequences having a length of $M_t/m$.

The sequence combination unit is configured to combine the m bit subsequences of the retransmitted data block with the m bit subsequences of the first-transmission data block separately to obtain the current to-be-transmitted data block, where m denotes the number of groups of bit polarization channels, and $M_t$ denotes the length of the tth-transmission data block.

The data transmission apparatus of this embodiment is configured to perform the data transmission method of the embodiment shown in FIG. 1. The apparatus of this embodiment and the method have similar implementation principles and technical effects. The implementation principles and technical effects of the apparatus are not described here again.

Figure 6:
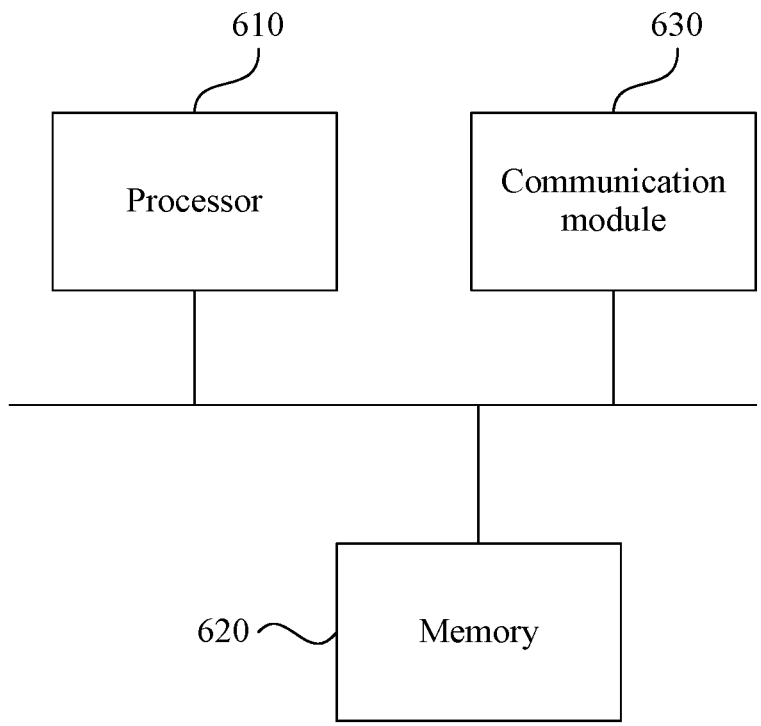
FIG. 6 is a diagram illustrating the structure of a data transmission device according to an embodiment of the present application.

FIG. 6 is a diagram illustrating the structure of a data transmission device according to an embodiment of the present application. As shown in FIG. 6, the device of the present application includes a processor 610, a memory 620, and a communication module 630. One or more processors 610 may be included in the device. One processor 610 is shown as an example in FIG. 6. One or more memories 620 may be included in the device. One memory 620 is shown as an example in FIG. 6. The processor 610, the memory 620, and the communication module 630 of the device may be connected via a bus or in other manners. The connection via a bus is shown as an example in FIG. 6. In this embodiment, the device may be a terminal (for example, a user equipment) or may be a network device (for example, a base station).

As a computer-readable storage medium, the memory 620 may be configured to store software programs and computer-executable programs and modules such as program instructions/modules (for example, the bit selection module 510, the polar-coding module 520, the combiner 530, and the modulator 540 in the data transmission apparatus) corresponding to the device of any embodiment of the present application. The memory 620 may include a program storage region and a data storage region. The program storage region may store an operating system and an application program required by at least one function. The data storage region may store data created according to the use of the device. Additionally, the memory 620 may include a high-speed random-access memory and may also include a nonvolatile memory such as at least one disk memory, a flash memory, or another nonvolatile solid-state memory. In some examples, the memory 620 may further include memories located remotely relative to the processor 610, and these remote memories may be connected to the equipment via a network. Examples of the preceding network include, but are not limited to, the Internet, an intranet, a local area network, a mobile communication network, and a combination thereof.

The communication module 630 is configured to communicatively interact with other synchronization nodes.

When serving as the first communication node, the data transmission device may be configured to perform the data transmission method applied to the first communication node in any previous embodiment and has corresponding functions and effects.

An embodiment of the present application provides a storage medium including computer-executable instructions which, when executed by a computer processor, cause the processor to perform a communication method applied to a first communication node. The method includes selecting a first number of bits from a to-be-transmitted information bit sequence to form a to-be-coded bit sequence of a retransmitted data block; polar-coding the to-be-coded bit sequence of the retransmitted data block to obtain a coded bit sequence; combining the coded bit sequence with a coded first-transmission data block to obtain the current to-be-transmitted data block; and performing digital baseband modulation on the current to-be-transmitted data block and then sending the modulated current to-be-transmitted data block to a second communication node.

It is to be understood by those skilled in the art that the term user equipment covers any suitable type of wireless user equipment, for example, a mobile phone, a portable data processing device, a portable web browser or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another computing device, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory device and system (a digital video disc (DVD) or a compact disk (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A data transmission method, applied to a first communication node, comprising:
    selecting a first number of bits from an information bit sequence to form a bit sequence of a retransmitted data block;
    polar-coding the bit sequence of the retransmitted data block to obtain a coded bit sequence;
    combining the coded bit sequence with a coded first-transmission data block to obtain a current data block; and
    performing digital baseband modulation on the current data block and then sending the modulated current data block to a second communication node;
    wherein the first-transmission data block is a data block transmitted from the first communication node to the second communication node for a first time, and the retransmitted data block is the data block transmitted from the first communication node to the second communication node for one or more other times in response to the data block failing to be transmitted from the first communication node to the second communication node for the first time; and
    wherein combining the coded bit sequence with the coded first-transmission data block to obtain the current data block comprises:
        bit-interleaving the coded bit sequence and the coded first-transmission data block separately to obtain an interleaved bit sequence;
        splitting the interleaved bit sequence into m bit subsequences each having a length of $M_t/m$; and
        combining the m bit subsequences of the retransmitted data block with the m bit subsequences of the first-transmission data block separately to obtain the current data block, wherein m denotes a number of groups of bit polarization channels, $M_t$ denotes a length of a data block for a tth transmission, and t denotes a number of transmissions.

2. The data transmission method of claim 1, wherein the first number is determined by one of a first parameter set or a second parameter set, wherein
    the first parameter set contains a physical channel resource parameter of the retransmitted data block and a spectrum efficiency parameter of the retransmitted data block, and the second parameter set contains a parallel-polarization-channel-related parameter.

3. The data transmission method of claim 2, wherein the physical channel resource parameter of the retransmitted data block comprises at least one of: a number of slots, a number of orthogonal frequency-division multiplexing (OFDM) symbols contained in each slot, a number of resource blocks, a number of frequency domain subcarriers contained in each resource block, a number of resource units in each resource block, or a number of spatial layers;
    the spectrum efficiency parameter of the retransmitted data block comprises at least one of: a modulation order, a transmission code rate, or a spectral efficiency;
    the parallel-polarization-channel-related parameter comprises at least one of: a number of bits in the information bit sequence, a bit polarization channel capacity of the first-transmission data block, a bit polarization channel capacity of the retransmitted data block, a length of the first-transmission data block, a length of the retransmitted data block, a channel feature indication parameter, the number of groups of bit polarization channels, or a modulation order.

4. The data transmission method of claim 3, wherein the number of bits in the information bit sequence is determined by a physical channel resource parameter of the first-transmission data block and a spectrum efficiency parameter of the first-transmission data block;
    the length of the first-transmission data block is determined by the physical channel resource parameter of the first-transmission data block and the modulation order;
    the length of the retransmitted data block is determined by the physical channel resource parameter of the retransmitted data block and the modulation order;
    the channel feature indication parameter is configured to indicate channel quality or a channel type.

5. The data transmission method of claim 3, wherein the first number is determined in one of the following manners:
    the first number is determined according to the number of slots, the number of OFDM symbols contained in each slot, the number of resource blocks, the number of frequency domain subcarriers contained in each resource block, the number of spatial layers, the modulation order, and the transmission code rate;
    the first number is determined according to the number of slots, the number of OFDM symbols contained in each slot, the number of resource blocks, the number of frequency domain subcarriers contained in each resource block, the number of spatial layers, and the spectral efficiency;
    the first number is determined according to the number of resource blocks, the number of resource units in each resource block, the number of spatial layers, the modulation order, and the transmission code rate;
    the first number is determined according to the number of resource blocks, the number of resource units in each resource block, the number of spatial layers, and the spectral efficiency; or
    the first number is determined according to the bit polarization channel capacity of the first-transmission data block, the bit polarization channel capacity of the retransmitted data block, and the number of bits in the information bit sequence.

6. The data transmission method of claim 1, wherein a selection principle of the first number of bits comprises selecting a first number of information bits having a lowest reliability from (t−1) transmitted data blocks.

7. The data transmission method of claim 1, wherein polar-coding the bit sequence of the retransmitted data block to obtain the coded bit sequence comprises:
    selecting a first number of bit positions having a highest reliability from transmission bit positions of the retransmitted data block to serve as information bit positions of the retransmitted data block;
    copying the bit sequence composed of the first number of bits to the information bit positions of the retransmitted data block separately to obtain a bit sequence of the retransmitted data block; and polar-coding the bit sequence to obtain the coded bit sequence.

8. The data transmission method of claim 7, wherein the transmission bit positions comprise bit positions other than punctured bit positions, or bit positions other than shortened bit positions.

9. A data transmission device, comprising a communication module, a memory, and one or more processors, wherein the communication module is configured to perform communicative interaction between a plurality of communication nodes;

the memory is configured to store one or more programs; and the one or more processors are configured to, when executing the one or more programs, perform the following steps:

selecting a first number of bits from an information bit sequence to form a bit sequence of a retransmitted data block;

polar-coding the bit sequence of the retransmitted data block to obtain a coded bit sequence;

combining the coded bit sequence with a coded first-transmission data block to obtain a current data block; and performing digital baseband modulation on the current data block and then sending the modulated current data block to a second communication node;

wherein the first-transmission data block is a data block transmitted from a first communication node to the second communication node for a first time, and the retransmitted data block is the data block transmitted from the first communication node to the second communication node for one or more other times in response to the data block failing to be transmitted from the first communication node to the second communication node for the first time; and wherein combining the coded bit sequence with the coded first-transmission data block to obtain the current data block comprises:

bit-interleaving the coded bit sequence and the coded first-transmission data block separately to obtain an interleaved bit sequence;

splitting the interleaved bit sequence into m bit subsequences each having a length of $M_t/m$; and combining the m bit subsequences of the retransmitted data block with the m bit subsequences of the first-transmission data block separately to obtain the current data block, wherein m denotes a number of groups of bit polarization channels, $M_t$ denotes a length of a data block for a tth transmission, and t denotes a number of transmissions.

10. The data transmission device of claim 9, wherein the first number is determined by one of a first parameter set or a second parameter set, wherein the first parameter set contains a physical channel resource parameter of the retransmitted data block and a spectrum efficiency parameter of the retransmitted data block, and the second parameter set contains a parallel-polarization-channel-related parameter.

11. The data transmission device of claim 10, wherein the physical channel resource parameter of the retransmitted data block comprises at least one of: a number of slots, a number of orthogonal frequency-division multiplexing (OFDM) symbols contained in each slot, a number of resource blocks, a number of frequency domain subcarriers contained in each resource block, a number of resource units in each resource block, or a number of spatial layers;

the spectrum efficiency parameter of the retransmitted data block comprises at least one of: a modulation order, a transmission code rate, or a spectral efficiency;

the parallel-polarization-channel-related parameter comprises at least one of: a number of bits in the information bit sequence, a bit polarization channel capacity of the first-transmission data block, a bit polarization channel capacity of the retransmitted data block, a length of the first-transmission data block, a length of the retransmitted data block, a channel feature indication parameter, the number of groups of bit polarization channels, or a modulation order.

12. The data transmission device of claim 11, wherein the number of bits in the information bit sequence is determined by a physical channel resource parameter of the first-transmission data block and a spectrum efficiency parameter of the first-transmission data block;

the length of the first-transmission data block is determined by the physical channel resource parameter of the first-transmission data block and the modulation order;

the length of the retransmitted data block is determined by the physical channel resource parameter of the retransmitted data block and the modulation order;

the channel feature indication parameter is configured to indicate channel quality or a channel type.

13. The data transmission device of claim 11, wherein the first number is determined in one of the following manners:

the first number is determined according to the number of slots, the number of OFDM symbols contained in each slot, the number of resource blocks, the number of frequency domain subcarriers contained in each resource block, the number of spatial layers, the modulation order, and the transmission code rate;

the first number is determined according to the number of slots, the number of OFDM symbols contained in each slot, the number of resource blocks, the number of frequency domain subcarriers contained in each resource block, the number of spatial layers, and the spectral efficiency;

the first number is determined according to the number of resource blocks, the number of resource units in each resource block, the number of spatial layers, the modulation order, and the transmission code rate;

the first number is determined according to the number of resource blocks, the number of resource units in each resource block, the number of spatial layers, and the spectral efficiency; or the first number is determined according to the bit polarization channel capacity of the first-transmission data block, the bit polarization channel capacity of the retransmitted data block, and the number of bits in the information bit sequence.

14. The data transmission device of claim 9, wherein a selection principle of the first number of bits comprises selecting a first number of information bits having a lowest reliability from (t−1) transmitted data blocks.

15. The data transmission device of claim 9, wherein polar-coding the bit sequence of the retransmitted data block to obtain the coded bit sequence comprises:

selecting a first number of bit positions having a highest reliability from transmission bit positions of the retransmitted data block to serve as information bit positions of the retransmitted data block;

copying the bit sequence composed of the first number of bits to the information bit positions of the retransmitted data block separately to obtain a bit sequence of the retransmitted data block; and polar-coding the bit sequence to obtain the coded bit sequence.

16. The data transmission device of claim 15, wherein the transmission bit positions comprise bit positions other than punctured bit positions, or bit positions other than shortened bit positions.

17. A non-transitory computer-readable storage medium, storing a computer program which, when executed by a processor, causes the processor to perform the following steps:

selecting a first number of bits from an information bit sequence to form a bit sequence of a retransmitted data block;

polar-coding the bit sequence of the retransmitted data block to obtain a coded bit sequence;

combining the coded bit sequence with a coded first-transmission data block to obtain a current data block; and performing digital baseband modulation on the current data block and then sending the modulated current data block to a second communication node;

wherein the first-transmission data block is a data block transmitted from a first communication node to the second communication node for a first time, and the retransmitted data block is the data block transmitted from the first communication node to the second communication node for one or more other times in response to the data block failing to be transmitted from the first communication node to the second communication node for the first time; and wherein combining the coded bit sequence with the coded first-transmission data block to obtain the current data block comprises:

bit-interleaving the coded bit sequence and the coded first-transmission data block separately to obtain an interleaved bit sequence;

splitting the interleaved bit sequence into m bit subsequences each having a length of $M_t/m$; and combining the m bit subsequences of the retransmitted data block with the m bit subsequences of the first-transmission data block separately to obtain the current data block, wherein m denotes a number of groups of bit polarization channels, $M_t$ denotes a length of a data block for a tth transmission, and t denotes a number of transmissions.

18. The non-transitory computer-readable storage medium of claim 17, wherein the first number is determined by one of a first parameter set or a second parameter set, wherein the first parameter set contains a physical channel resource parameter of the retransmitted data block and a spectrum efficiency parameter of the retransmitted data block, and the second parameter set contains a parallel-polarization-channel-related parameter.

19. The non-transitory computer-readable storage medium of claim 18, wherein the physical channel resource parameter of the retransmitted data block comprises at least one of: a number of slots, a number of orthogonal frequency-division multiplexing (OFDM) symbols contained in each slot, a number of resource blocks, a number of frequency domain subcarriers contained in each resource block, a number of resource units in each resource block, or a number of spatial layers;

the spectrum efficiency parameter of the retransmitted data block comprises at least one of: a modulation order, a transmission code rate, or a spectral efficiency;

the parallel-polarization-channel-related parameter comprises at least one of: a number of bits in the information bit sequence, a bit polarization channel capacity of the first-transmission data block, a bit polarization channel capacity of the retransmitted data block, a length of the first-transmission data block, a length of the retransmitted data block, a channel feature indication parameter, the number of groups of bit polarization channels, or a modulation order.

20. The non-transitory computer-readable storage medium of claim 19, wherein the number of bits in the information bit sequence is determined by a physical channel resource parameter of the first-transmission data block and a spectrum efficiency parameter of the first-transmission data block;

the length of the first-transmission data block is determined by the physical channel resource parameter of the first-transmission data block and the modulation order;

the length of the retransmitted data block is determined by the physical channel resource parameter of the retransmitted data block and the modulation order;

the channel feature indication parameter is configured to indicate channel quality or a channel type.

* * * * *